United States Patent

[11] 3,617,027

[72] Inventor Domer Scaramucci
 3245 S. Hattie, Oklahoma City, Okla.
 73129
[21] Appl. No. 51,630
[22] Filed July 1, 1970
[45] Patented Nov. 2, 1971
 Continuation-in-part of application Ser. No.
 587,002, Oct. 17, 1966, now abandoned.

[54] ROCKING SEAT VALVE
 6 Claims, 4 Drawing Figs.
[52] U.S. Cl. .................................................. 251/315,
 251/175, 251/317
[51] Int. Cl. .............................................. F16k 27/06
[50] Field of Search ......................................... 251/175,
 315

[56] References Cited
 UNITED STATES PATENTS
 3,235,224 2/1966 Grove .......................... 251/315 X
 3,331,581 7/1967 O'Connor ..................... 251/315
 Primary Examiner—Harold W. Weakley
 Attorney—Dunlap, Laney, Hessin & Dougherty ABSTRACT: A ball valve having upstream and downstream seats sealed to the body at the inner peripheries of the seats. The seats twist or rock upon upstream and downstream movements of the ball. The upstream seat is forced away from the ball upon closing of the valve to prevent damage to the seat by the nose of the ball, and the outer peripheral portion of the seat is out of the path of the nose of the ball on opening of the valve. Various designs of seating surfaces for the seats are disclosed.

INVENTOR
DOMER SCARAMUCCI

ROCKING SEAT VALVE

CROSS REFERENCE FOR RELATED APPLICATIONS

This is a continuation-in-part of applicant's copending application of the same title, Ser. No. 587,002, filed Oct. 17, 1966 and now abandoned.

BACKGROUND OF THE INVENTION

1. Field of the Invention

This invention relates generally to improvements in ball valves, and more particularly, but not by way of limitation, to an improved valve seat particularly suited for ball-type valves.

2. Description of the Prior Art

As it is well known in the art, a large portion of ball valves presently in use utilize a floating ball. That is, the valve ball is mounted in the valve chamber in a manner to be moved upstream and downstream when in a closed position. Thus, the valve seats are normally constructed to either move as a whole with the valve ball, or to flex in response to movement of the valve ball in order to provide seals in both high- and low-pressure service. As a result, however, the upstream seat is ordinarily forced or flexed into interference with the valve ball as the valve ball is being moved to a closed position, such that the edges of the valve ball port at the upstream end of the valve, which is commonly known as the "nose" of the valve ball, drag across the upstream valve seat and cause the upstream valve seat to become damaged after a relatively short period of service. With most prior valve seats, a sufficient pressure differential is developed between the inlet of the valve and the valve chamber when the valve ball is approaching a closed position to either bodily force the upstream seat away from the inlet into tight engagement with the valve ball, or to distort the upstream seat into tight engagement with the valve ball.

SUMMARY OF THE INVENTION

The present invention, in its broader aspects, contemplates a valve seat formed of a relatively hard elastic material which is, in effect, mounted in a ball valve chamber in a biased condition when the ball is centered in the valve chamber. The inner peripheral portion of the valve seat sealingly engages the adjacent walls of the valve chamber around the respective inlet or outlet of the valve; whereas the outer peripheral portion of the seat is constructed and arranged to flex or rock in the valve chamber. Thus, when the present valve seat is used as an upstream seat, a pressure differential developed between the inlet of the valve and the valve chamber when the valve ball is approaching a closed position will simply be effective to force the upstream seat out of interference with the ball, and particularly the "nose" of the ball. Since the inner peripheral portion of the seat is in sealing engagement with the wall of the valve chamber, the upstream pressure will not get behind the upstream seat and force it bodily into interference with the valve ball. It may also be noted that with this type of valve seat construction, the downstream seat is free to follow the upstream and downstream movements of the valve ball and maintain an effective seal in both high- and low-pressure service conditions.

An object of this invention is to minimize the damage to ball valve seats, and particularly upstream ball valve seats, caused by repeated opening and closing movements of the valve ball.

Another object of this invention is to provide a ball valve seat which requires no machining and which will yet efficiently perform its sealing functions.

A further object of this invention is to provide a ball valve seat which may be used as either an upstream or a downstream seat with equal efficiency.

A still further object of this invention is to provide a ball valve which may be economically manufactured, which will have a long service life and which may be efficiently used in both high and lower pressure service conditions.

Other objects and advantages of the invention will be evident from the following detailed description when read in conjunction with the accompanying drawings which illustrate the invention.

DESCRIPTION OF THE PREFERRED EMBODIMENTS

Figure 1:
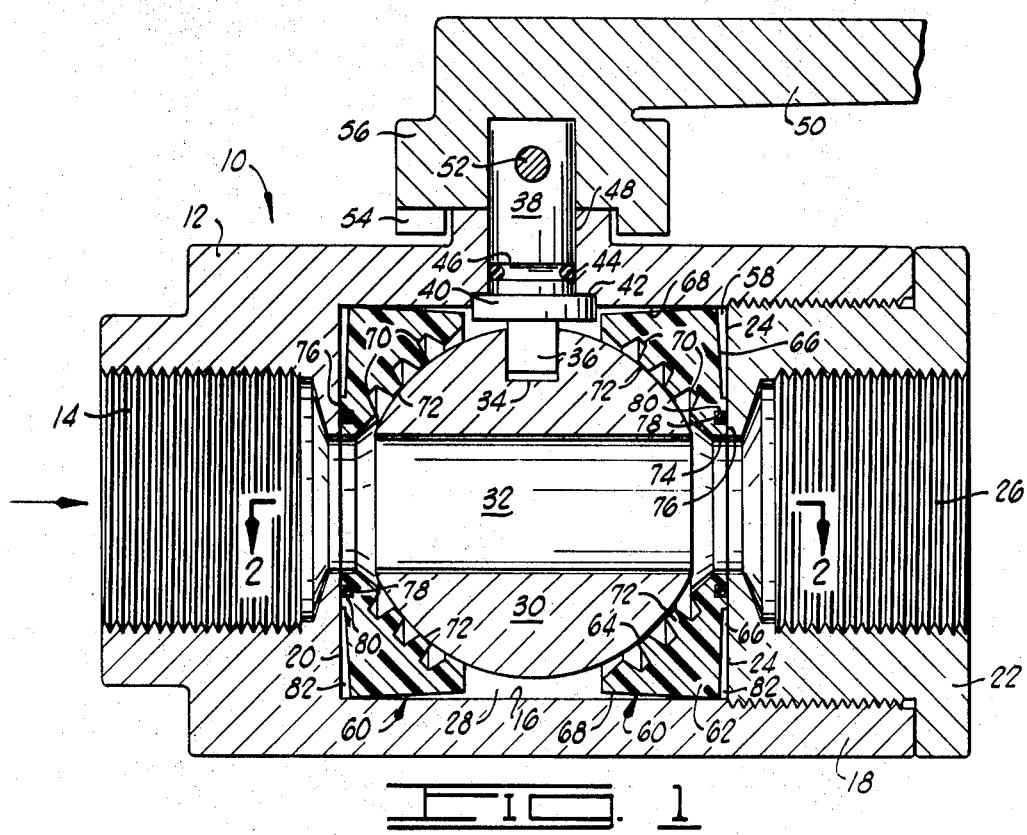
FIG. 1 is a vertical sectional view through a ball valve constructed in accordance with this invention.

Referring to the drawings in detail, and particularly FIG. 1, reference character 10 generally designates a ball valve constructed in accordance with this invention. The valve 10 includes a valve body 12 having a threaded inlet 14 in one end thereof and a larger counterbore 16 extending from the opposite end 18 thereof to provide a shoulder or annular wall 20 at the intersection of the inlet 14 and counterbore 16 which extends substantially normal to the axis of the inlet 14. A connector 22 is threadedly secured in the end 18 of the valve body 12 and has a flat inner end 24 forming a shoulder or annular wall which also extends substantially normal to the axis of the inlet 14. A threaded outlet 26 is formed through the center of the connector 22 in alignment with the inlet 14, such that the valve 10 may be secured in a fluid circuit. It will also be understood that rather than having the inlet 14 and outlet 26 threaded for connection with adjacent sections of a pipeline, the valve 10 could be secured in the fluid circuit by other mechanisms, such as flanges or union-type connectors.

The counterbore 16, between the end walls 20 and 24, forms a valve chamber 28 for a valve ball 30. The ball 30 has the usual port 32 therethrough which is aligned with the inlet 14 and outlet 26 when the valve is in an open position as illustrated in FIG. 1 and which is extended in a direction normal to the axis of the inlet 14 and outlet 26 when the valve is in a closed position as illustrated, for example, in FIG. 3.

As shown in FIG. 1, the ball 30 is provided with a rectangular slot 34 in the top thereof to receive the lower end 36 of a valve stem 38 by means of which the ball 30 is turned between its open and closed positions. The end 36 of the valve stem 38 is rectangular in cross section and the slot 34 is elongated, such that the ball 30 may be moved upstream and downstream in the valve chamber 28 when in a closed position, as is normal in "floating ball" valve constructions. A circumferential flange 40 is formed around the valve stem 38 immediately above the lower rectangular end 36 to engage a flat surface 42 provided in the top of the valve chamber 28, thus preventing the inadvertent removal of the valve stem 38 from the valve body 12 during operation. A sealing ring 44 is disposed in a circumferential groove 46 formed around the valve stem 38 to seal with the walls of the aperture 48 formed in the valve body 12 for receiving the valve stem. A suitable handle 50 is secured on the upper or outer end of the valve stem 38 by a pin or the like for manually turning the valve stem 38 and valve ball 30. A projection 54 is formed on the lower end of the hub 56 of the handle 50 to engage stops (not shown) formed on the valve body 12 to limit the turning movement of the ball 30 to substantially 90° between its open and closed positions as is common in the art.

The walls of the counterbore 16 adjacent the opposite ends of the valve chamber 28, and the end walls 20 and 24, form what may be considered sockets 58 for receiving the valve seats generally designated by the reference character 60. As shown in FIG. 1, two of the valve seats 60 are shown, one for each of the upstream and downstream ends of the valve chamber 28, such that the valve 10 may be used in either direction in the fluid circuit. That is, what has been designated as the inlet 14 may actually be connected as either the inlet or the outlet of the valve.

Each of the respective upstream and downstream valve seats 60 comprises a bearing ring 62 of generally triangular cross section having a tapered seating surface 64 facing the valve ball 30, and extending at an angle of about 45° to the axis of the ring, an end wall 66, and an outer periphery 68. A plurality of concentric grooves 70 are formed in the seating surface 64 to form a plurality of sealing lips 72 for engaging the ball 30.

The inner periphery of bearing ring 62 is formed to have a relatively short cylindrical opening 74 which is preferably coterminous with the respective upstream or downstream valve openings 14 and 26, and an annular raised portion or sealing shoulder 76 which may be placed in contact with the respective annular end wall 20 or 24 in sealing relationship. An O-ring 78 is carried in a mating groove 80 in the shoulder 76 to enhance the seal of the ring 62 to the respective wall 20 or 24. The sealing ring end wall 66 is extended outwardly from the sealing shoulder 76 to join the outer periphery 68 at a slight inward taper relative to the annular wall 20 or 24. Thus, when the bearing rings 62 are in their more relaxed positions, as shown in FIG. 1, the sealing shoulder 76 and O-ring 78 make sealing contact with annular wall 20 or 24 while an expansion chamber 82 is formed within socket space 58 to allow for flexure of the bearing ring 62 during its various operational configurations, as will be further described below.

The bearing ring 62 is formed of a material having good tear-resistance qualities so that it will not be damaged by repeated engagement with the nose of the valve ball 30, and yet the material should be sufficiently flexible so that it can be distorted into the expansion chamber 82 when a force is imposed thereon by the valve ball 30, as will be set forth more fully below. Thus, the bearing ring 62 may be formed of what are commonly known as plastic materials such as nylon or Telfon and, if desired, the materials may be reinforced, as with the fiberglass.

OPERATION OF FIGS. 1–3 EMBODIMENT

When the valve ball 30 is in an open position, as shown in FIG. 1, it is centered in the valve chamber 28. In this position of the ball 30, the ball engages the central portion of the seating surface 64 of each of the valve seats 60. Thus, the respective valve seats 60 are in firm engagement about the valve ball 30 in their position of least flexure while still maintaining their respective sealing shoulders 76 and O-rings 78 in contact with the annular walls 20 and 24.

Figure 2:
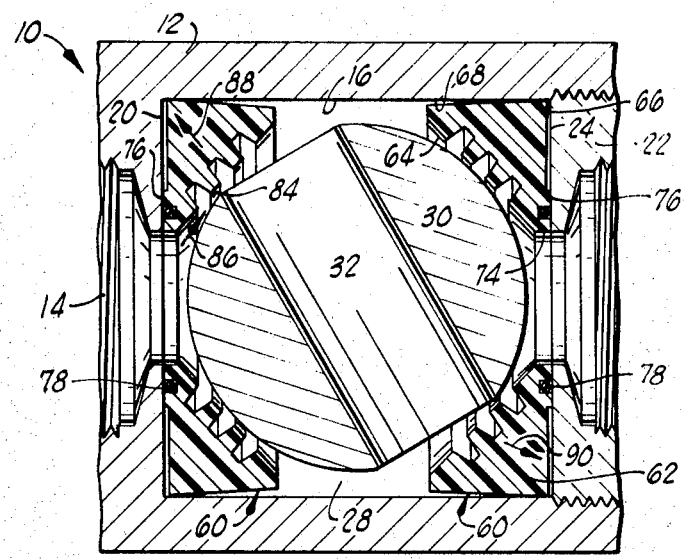
FIG. 2 is a partial sectional view taken substantially along lines 2—2 of FIG. 1 illustrating the operation of the valve seats when the valve ball is approaching a closed position.

FIG. 2 depicts the position of the valve ball 30 as it approaches closure. That is, the position just prior to absolute cutoff whereat the present invention carries out its primary function of directing fluid pressure or forces such that each valve seat 60 is protected from damage by the nose of the valve ball 30. Thus, with the nose 84 of valve ball 30 positioned as shown in FIG. 2, upstream fluid pressure will seek flow along the path 86, thereby tending to force the upstream bearing ring 62 in the direction of arrow 88 to relieve the pressure of bearing ring 62 against the valve ball 30, especially nose portion 84. The upstream sealing shoulder 76 and O-ring 78 will remain in sealing relationship against the annular wall 20 to avoid the building up or trapping of pressure between bearing ring 62 and annular wall 20 which would tend to force the bearing ring 62 against the valve ball 30.

Again referring to the position just prior to closure of valve 10 (FIG. 2) the downstream bearing ring 62 will experience a slightly greater pressure in the area of the valve ball port 32 than downstream or in opening 26 and this too will tend to maintain the downstream sealing shoulder 72 and O-ring 78 in sealing relationship with the annular wall 24, while forcing the more outer extremities of the bearing ring 62 in the downstream direction to ease the tension against the valve ball 30, especially when the nose portion comes into contact with the downstream seat. That is, the greater upstream pressure within the valve port 32 will produce a force in the general direction of arrow 90 to ease the tension of the bearing ring 62 while maintaining the sealing relationship between bearing sealing shoulder 76 and the annular end wall 24. Here again, the sealing shoulder 76 and O-ring 78 prevent the entry of fluid in behind the bearing ring 62 to the space which has been referred to as the expansion chamber 82.

Figure 3:
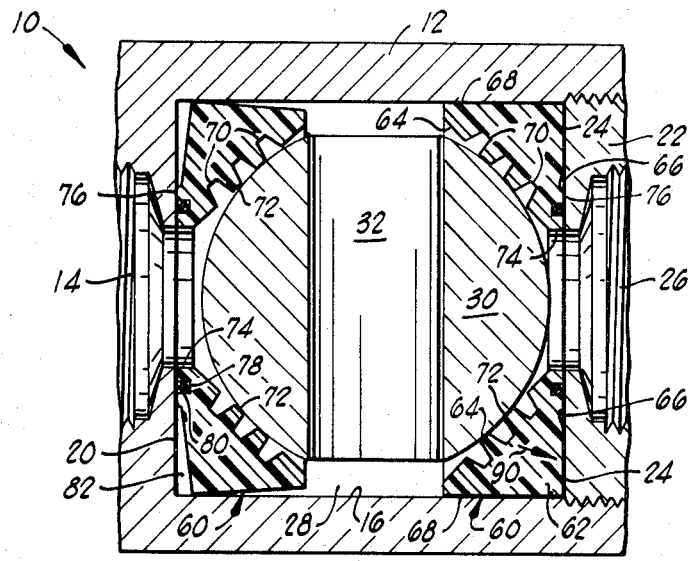
FIG. 3 is a view similar to FIG. 2 showing the positions of the valve seats when the ball is fully closed.

As is well known in the ball valve art, the valve ball 30 is controlled by a sliding key arrangement (key 36 and elongated rectangular slot 34 of FIG. 1) which enables the ball to slide freely under the upstream pressure when in the valve-closed position. Hence, when the ball 30 is in the partially closed position, as shown in FIG. 2, the upstream pressure will cause appreciable endwise movement of the ball 30 in the downstream direction to further add to its sealing force against the downstream bearing ring 62. As shown in FIG. 3, the completely closed position, the valve ball 30 is held in the downstream direction by the full force of the upstream pressure. Thus, the upstream bearing ring 62 is in its most relaxed state maintaining a minimum pressure as between the tapered seating surface 64 and valve ball 30 such that socket spaces 58 are at maximum volume, the sealing shoulder 76 still, however, being maintained in sealing relationship against the annular wall 20. The downstream bearing ring 62 receives a maximum force from valve ball 30 upon the tapered surface 64 due to the full shift of valve ball 30 downstream. This maximum force, as shown generally in the direction of arrow 90, tends to compact completely the downstream bearing ring 62 into the end reaches of the valve chamber 28 such that the sockets 58 are completely utilized to receive the flexed bearing ring 62 to maintain the desired seal between the sealing shoulder 76 and the annular wall 24, and between ball 30 and seating surface 64. The seating surface 64 maintains more than adequate bearing tension against valve ball 30 at the lips 72, between each of the annular grooves 70, and the danger of entrapment of abrasive particles is minimized since such particles are trapped within the grooves 70 and out of damaging relationship to either the valve ball 30 or the bearing area of seating surface 64. It should also be noted that the lips 72 provide multiple sealing surfaces in engagement with the ball 30 to enhance the seal between the ball and the downstream seat 60.

EMBODIMENT OF FIG. 4

A further modified valve seat 120 is particularly desirable for use in control of heated fluids, e.g., heat intense enough to break down the more common valve seat materials. The valve seat 120 comprises a bearing ring 122, once again having the generally triangular shape, but being modified somewhat in overall configuration. The bearing ring 122 is defined by an outer periphery 124 and inner periphery 126, as well as opposing sidewall portions 128 and 130. A tapered seating surface 132 extends at an angle of about 45° from the axis of the ring between the inner sidewall 128 and the inner periphery 126, the tapered seating surface 132 containing a concentric cut or flexure space 134 therein such that an annular lip 135 results. The outer sidewall 130 is formed to be slightly inwardly canted with respect to annular wall 24 such that they are in contact about their inner peripheries and an outwardly increasing flexure space or socket 136 remains therebetween.

The annular wall 24 or the inner end wall of the valve end connector 22, is formed to have an inner, annular projection 138 which extends to within near-contacting relationship with the valve ball 30. The extension 138 has a tapered inner face 140 in symmetry with the valve ball 30 and remaining out of contact therewith during normal conditions of valve operation. Thus, in the event that very hot material should break down or otherwise decompose the seal about tapered seating surface 132 of the bearing ring 122, the tapered portion 140 of annular extension 138 can still act as an emergency seal as the valve ball 30 shifts and comes in contact therewith.

An annular bead 142 is formed about the inner periphery 126 of bearing ring 122 to provide a secure sealing engagement about the outer circumferential surface 144 of the cylindrical extension 138. This then affords the sealing contact between external fluid pressure and pressure within the valve chamber which would tend to cause bearing ring 122 to be forced against the valve ball 30, and particularly the valve ball nose, during on-off manipulation.

Figure 4:
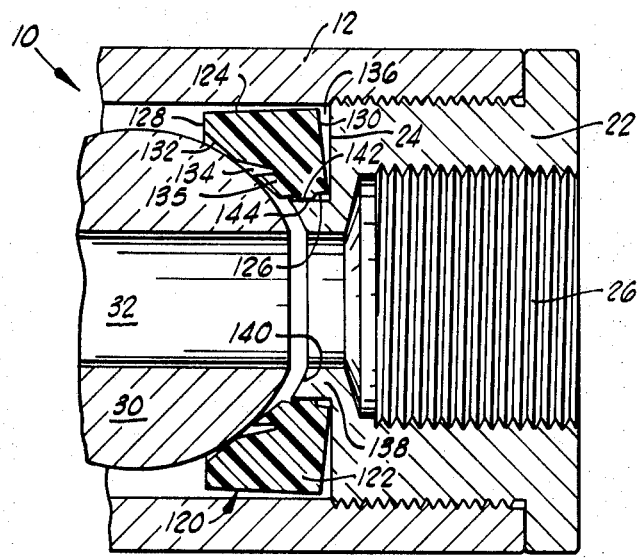
FIG. 4 is another partial sectional view illustrating a modified valve seat.

In the operation of a valve 10 employing valve seat 120 (FIG. 4) in upstream and downstream positions, the overall function is similar to that described in FIGS. 2 and 3. That is, when the valve ball 30 is turned to a near-closed position such that the "nose" of valve ball 30 is nearly in contact with the seating surface 132 of bearing ring 122, the upstream pressure is employed to cause relief of the bearing ring pressure away from the valve ball 30 instead of causing a further pressing of the bearing ring 122 against the valve ball 20 to increase wear and damage.

The upstream pressure is sealed by the bearing of annular bear 142 against the cylindrical surface 144 of the circular inner projection 138 so that all upstream pressure is directed between valve ball 30 and the tapered bearing surface 132. When the sharper nose portion of valve ball 30 comes into contact with the bearing ring 122, the upstream pressure will have been utilized to flex the bearing ring 122 such that its outer end wall 130 is forced into the volume or socket 136 while sealing contact is still maintained by the tapered bearing surface 132. The concentric cut 134 and annular lip 135 serve to improve the actual bearing surface of bearing ring 122 as they effectively enlarge the area of bearing or sealing contact between the tapered bearing surface 132 and the valve ball 30 while still allowing self-cleaning capabilities wherein dirt particles will not be trapped and held in abrading contact.

The downstream bearing ring 122 reacts in a similar manner. At near closure, the higher pressure within the valve port 32 is directed between the valve ball 30 and the tapered seating surface 132 due to the seal of the annular bead 142 and the circular surface 144 about the outlet opening 26 of the valve. Here again, the seating surface 132 and concentric cut 134 serve to seek the proper bearing relationship about the valve ball 30, its nose portion and valve port 32. Also, as is conventional ball valve practice, as the valve 10 approached a closed position, the sliding connection of valve ball 30 (key 36 and slot 34, FIG. 1) allows it to be carried with the fluid pressure downstream against the bearing ring 122 such that its sealing relationship is further enhanced as bearing ring 122 is flexed outward and downstream such that the outer end wall 130 closes flexure space 136 to rest against the annular wall 24 and the outer periphery 124 can move into compact relationship with the counter bore 16 or inner wall of valve body 12. As stated previously, the bearing ring 122 is especially desirable for heated or corrosive fluid materials, and in the event that the seating surface of bearing ring 122 should be melted or otherwise worn down, the symmetrically extending face 140 of inner, circular extension 138 will come into contact with the valve ball 30 to stop or greatly reduce fluid leakage.

From the foregoing it will be apparent that the present invention provides a novel valve seat for use in a ball valve to provide an efficient and effective control of fluid flow. The valve seat will provide the dual functions of supporting the valve member in a desired position while providing an effective seal with the valve member to prevent the flow of fluid in the outlet of the valve. The valve seat of this invention as set forth in varying alternatives may be employed in both high- and low-pressure services for control of fluids at varying temperatures, the higher the pressure being controlled the tighter will be the seal provided by the valve seat. It should also be apparent that the valve seat of this invention requires no machining and is economical to produce.

Changes may be made in the combination and arrangement of parts or elements as heretofore set forth in the specification and shown in the drawings, it being understood that changes may be made in the embodiments disclosed without departing from the spirit and scope of the invention as set forth in the following claims.

What is claimed is:

1. A valve, comprising:

a body having a valve chamber therein, inlet and outlet openings communicating with the valve chamber, and a seat-receiving socket in the valve chamber around each of said openings defined by an end wall extending substantially normal to the axis of the respective opening and a cylindrical outer wall extending from the respective end wall;

a valve ball mounted in the valve chamber for movement downstream when in a closed position; and a valve seat in each of the seat-receiving sockets, each of said valve seats comprising:

an elastic material ring having a tapered seating surface extending at about 45° from the axis of the ring and facing the valve ball, an annular sealing surface adjacent the inner periphery thereof held in sealing engagement with the respective socket end wall by the valve ball when the valve ball is centered in the valve chamber, and an end wall extending outwardly from said sealing surface at an angle to the respective socket end wall when the ring is in a substantially relaxed position, said ring being flexible for movement of the end wall thereof toward the respective socket end wall in response to force applied to the seating surface thereof, and said ring being sized such that both the inner and outer peripheral portions of said seating surface are out of contact with the valve ball in all operating positions of the valve ball, whereby the downstream valve seat flexes to follow the downstream movement of the valve ball and the upstream valve seat remains in engagement with the end wall of the socket surrounding the inlet and out of interference with the valve ball when the valve ball is moved toward a closed position, and characterized further to include:

a sealing lip formed on the seating surface of the ring surrounding the outlet opening in a position to engage the valve ball when the valve ball is centered in the valve chamber.

2. A valve as defined in claim 1 wherein a plurality of concentric sealing lips are formed on the seating surface of the ring surrounding the outlet opening.

3. A valve as defined in claim 1 characterized further to include a sealing ring in the sealing surface of each elastic material ring.

4. A valve, comprising:

a body having inlet and outlet openings therein and a valve chamber communicating with said openings, said valve chamber having an annular wall around each of said openings extending substantially normal to the axis of the respective opening:

a valve ball mounted in the valve chamber for movement toward and away from the outlet opening when in a closed position; and a valve seat in the valve chamber around each of said openings, each of said valve seats comprising:

an elastic material ring having a tapered seating surface extending at about 45° from the axis of the ring and facing the valve ball, and an end wall facing the annular wall around the respective opening, said end wall being extended at an increasing distance from said annular wall proceeding from the inner to the outer periphery of the ring when the ring is in a substantially relaxed condition, said ring being sized for engagement of the seating surface thereon with the valve ball at an area between the inner and outer peripheries of the ring when the valve ball is centered in the valve chamber to be held in sealing engagement with the body around the respective opening adjacent the inner periphery of the ring and being sized such that both the inner and outer peripheral portions of said seating surface are out of contact with the valve ball in all operating positions of the valve ball, said ring being distortable by the valve ball moving toward the respective opening until the end wall thereof is in full engagement with the respective annular wall, said ring further including an annular lip formed on the portion of the seating surface of each seat in engagement with the valve ball when the valve ball is centered in the valve chamber, whereby when the valve ball moves toward the outlet, the seat around the outlet opening is distorted and the seating surface thereof remains in engagement with the valve ball, and the seat around the inlet opening is held out of interference with the valve ball by fluid pressure reacting on the seating surface thereof when the valve ball is moved near a closed position.

5. A valve, comprising:

a body having inlet and outlet openings therein, and a valve chamber communicating with said openings, said valve chamber having an annular wall around each of said openings extending substantially normal to the axis of the respective opening and an annular flange around each of said openings projecting from the respective annular wall into the valve chamber;

a valve ball mounted in the valve chamber for movement toward and away from the outlet opening when in a closed position; and a valve seat in the valve chamber around each of said openings, each of said valve seats comprising:

an elastic material ring disposed around the respective annular flange having a tapered seating surface extending at about 45° from the axis of the ring and facing the valve ball, and an end wall facing the annular wall around the respective opening, said end wall being extended at an increasing distance from said annular wall proceeding from the inner to the outer periphery of the ring when the ring is in a substantially relaxed position, said ring being sized for engagement of the seating surface thereon with the valve ball at an area between the inner and outer peripheries of the ring when the valve ball is centered in the valve chamber to be held in sealing engagement with the body around the respective opening adjacent the inner periphery of the ring and being sized such that both the inner and outer peripheral portions of said seating surface are out of contact with the valve ball in all operating positions of the valve ball, and said ring being distortable by the valve ball moving toward the respective opening until the end wall thereof is in full engagement with the respective annular wall, whereby when the valve ball moves toward the outlet, the seat around the outlet opening is distorted and the seating surface thereof remains in engagement with the valve ball, and the seat around the inlet opening is held out of interference with the valve ball by fluid pressure reacting on the seating surface thereof when the valve ball is moved near a closed position.

6. A valve as defined in claim 5 characterized further to include a sealing bead formed around the inner periphery of each seat sealingly engaging the outer periphery of the respective flange.